(12) United States Patent
Nakabayashi et al.

(10) Patent No.: US 7,956,822 B2
(45) Date of Patent: Jun. 7, 2011

(54) MOUNTING MECHANISM AND HEAD-MOUNTED IMAGE DISPLAY APPARATUS

(75) Inventors: Takaaki Nakabayashi, Tokyo (JP); Yoshihiro Saito, Hachioji (JP); Toshiyuki Okuma, Chofu (JP)

(73) Assignee: Canon Kabushiki Kaisha, Tokyo (JP)

(*) Notice: Subject to any disclaimer, the term of this patent is extended or adjusted under 35 U.S.C. 154(b) by 828 days.

(21) Appl. No.: 11/456,705

(22) Filed: Jul. 11, 2006

(65) Prior Publication Data
US 2007/0013611 A1 Jan. 18, 2007

(30) Foreign Application Priority Data

Jul. 13, 2005 (JP) .................................. 2005-204829
Jul. 5, 2006 (JP) .................................. 2006-185684

(51) Int. Cl.
*G09G 5/00* (2006.01)
(52) U.S. Cl. ........................................................ 345/8
(58) Field of Classification Search .................... 345/7–9
See application file for complete search history.

(56) References Cited

U.S. PATENT DOCUMENTS

| | | | | |
|---|---|---|---|---|
| 4,637,536 A * | 1/1987 | Wong | ............................. | 224/262 |
| 4,683,349 A * | 7/1987 | Takebe | ............................. | 174/69 |
| 5,003,300 A * | 3/1991 | Wells | ............................. | 345/8 |
| 5,734,421 A * | 3/1998 | Maguire, Jr. | .................. | 348/121 |
| 6,172,657 B1 * | 1/2001 | Kamakura et al. | ............... | 345/8 |
| 6,486,855 B1 * | 11/2002 | Pandolfi | ............................. | 345/7 |
| 6,507,359 B1 * | 1/2003 | Muramoto et al. | ............. | 348/47 |
| 6,677,919 B2 * | 1/2004 | Saito | ............................. | 345/8 |
| 2003/0115661 A1 * | 6/2003 | Dobbie et al. | ..................... | 2/422 |

FOREIGN PATENT DOCUMENTS

JP   8-29724    2/1996
JP   8-125948   5/1996

* cited by examiner

*Primary Examiner* — Richard Hjerpe
*Assistant Examiner* — Carolyn R Edwards
(74) *Attorney, Agent, or Firm* — Cowan, Liebowitz & Latman, P.C.

(57) ABSTRACT

This specification discloses a mounting mechanism for a display portion onto the head in which the movement range of a wearer is not restricted and it becomes possible to make the display portion follow the head. This mounting mechanism has a head mounting portion for mounting the display portion on the head, a weight supporting portion mounted on any other body portion than the head for supporting part of the weight of the head mounting portion, and a connecting member for connecting the head mounting portion and the weight supporting portion together so that the head mounting portion may be movable following the movement of the head.

5 Claims, 9 Drawing Sheets

MOUNTING MECHANISM AND HEAD-MOUNTED IMAGE DISPLAY APPARATUS

BACKGROUND OF THE INVENTION

1. Field of the Invention

This invention relates to a mounting mechanism for a display portion onto a head, and a head-mounted image display apparatus using the mounting mechanism.

2. Related Background Art

A visual apparatus called a head-mounted display is used to observe a video image or a display of a personal computer. As mounting mechanisms for an apparatus of this kind onto the head, there are known, for example, a goggle type which is mounted onto the head by tightening the head, and a helmet type which is mounted onto the head by covering and holding the whole of the head.

Japanese Patent Application Laid-open No. H08-125948 discloses a suction mounting type head-mounted display in order to mitigate the feeling of tightening of a head in the goggle type, or mitigate the feeling of tightness, the cumbersomeness of mounting and dismounting, etc. in the helmet type. In this example, a display portion is adapted to be brought into close contact with the face, and be mounted with the internal pressure reduced by a suction pump. At this time, there is adopted a construction in which a supporting member freely movable in a predetermined space is provided so as to be capable of being held by a small suction force, and the other end thereof is fixed to a desk or the like to thereby mitigate the weight of the apparatus. Also, Japanese Patent Application Laid-open No. H08-029724 discloses a type used with a display portion not held on the head but hung on the shoulder in order to mitigate the stiffness of the shoulders or fatigue due to the weight of the apparatus.

However, in the display proposed in the above-mentioned Japanese Patent Application Laid-open No. H08-125948, the other end of the connecting member is supported by a fixture such as a desk in order to mitigate the weight of the apparatus and therefore, the apparatus can be moved only in a predetermined space. Also, in the conventional example of the mounting mechanism, which is of type of hanging on shoulders, proposed in the above-mentioned Japanese Patent Application Laid-open No. H08-029724, the display portion is not only not held on the head, but also not movable relative to a supporting portion and therefore, when the wearer has moved his head, the display portion does not follow it.

SUMMARY OF THE INVENTION

In view of the above-noted problems, the present invention has as its object to provide a head mounting mechanism which enables a display portion or the like to follow the head without the movement range of a wearer being restricted.

The mounting mechanism of the present invention is suitable, for example, as a mounting mechanism for a head-mounted display. The illustrative mounting mechanism of the present invention has a head mounting portion for mounting a display portion on the head, a weight supporting portion to be mounted on any other body portion than the head and for supporting part of the weight of the head mounting portion, and a connecting member for connecting the head mounting portion and the weight supporting portion together so that the head mounting portion may be movable following the movement of the head.

DESCRIPTION OF THE PREFERRED EMBODIMENTS

Some embodiments of the present invention will hereinafter be described with reference to the drawings.

Embodiment 1

Figure 1:
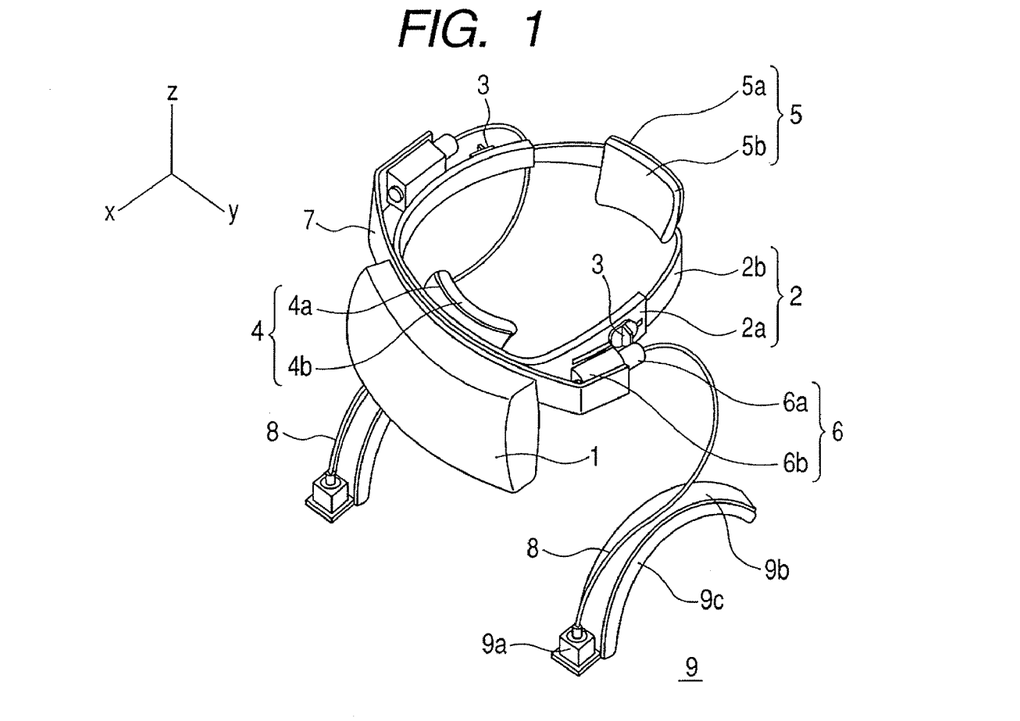
FIG. 1 is a perspective view of a head-mounting image display apparatus according to Embodiment 1 of the present invention.
Figure 2:
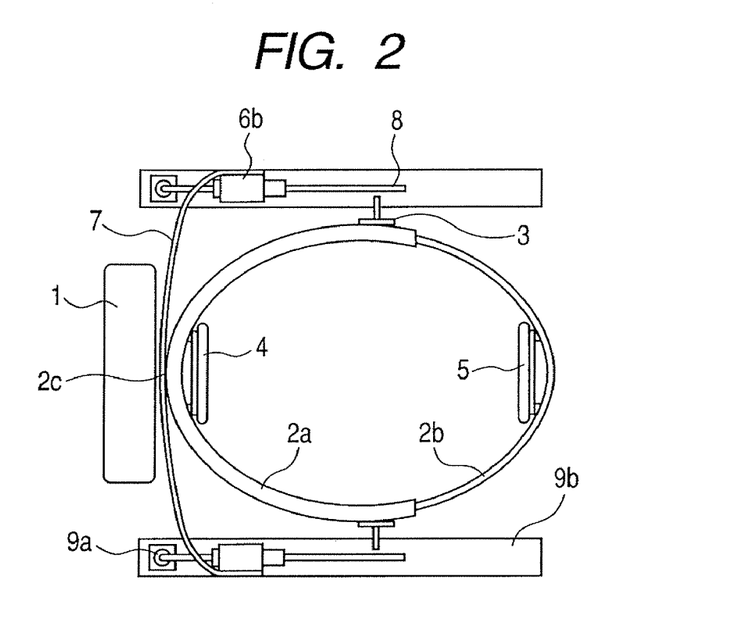
FIG. 2 is a top plan view of the head-mounted image display apparatus according to Embodiment 1 of the present invention.

In Embodiment 1, the present invention is applied to thereby construct a head-mounted image display apparatus having a head mounting portion provided with a display portion and a shoulder mounting portion (weight supporting portion). FIG. 1 shows a perspective view of the head-mounted image display apparatus according to the present embodiment. Also, FIG. 2 shows a top plan view of the head-mounted image display apparatus according to the present embodiment.

In FIG. 1, the reference numeral 1 designates a display portion, the reference 2 denotes a mounting portion, the reference numeral 3 designates position adjustment knobs, the reference numeral 4 denotes a forehead portion pressing portion, and the reference numeral 5 designates an occipital pressing portion. Also, the reference numeral 6 denotes head supporting portions, the reference numeral 7 designates a supporting frame, the reference numeral 8 denotes elastic members as connecting members, and the reference numeral 9 designates a shoulder supporting portion.

The image display apparatus according to the present embodiment is divided roughly into a head mounting portion provided with a display portion, and a shoulder mounting portion. The head mounting portion provided with the display portion is constituted by the display portion 1, the mounting portion 2, the position adjustment knobs 3, the forehead portion pressing portion 4, the occipital pressing portion 5, the head supporting portions 6 and the supporting frame 7. Also, the shoulder mounting portion is comprised of a shoulder supporting portion 9. The head mounting portion and the shoulder mounting portion are connected together by the elastic members 8 such as piano wire.

The display portion 1 is constituted by a display element, not shown, and an optical system (not shown) for enlarging and displaying an image on the display element. The mounting portion 2 is comprised of a front frame 2a formed of a rigid body, and a rear frame 2b movable back and forth relative to the front frame 2a. The rear frame 2b is formed by a member having flexibility such as, for example, a belt.

In the present embodiment, as shown in FIG. 2, a shaft 2c is provided on the left and right sides of the center of the front frame 2a. The display portion 1 is integrally coupled to the shaft 2c provided on this front frame 2a. The position adjustment knobs 3 are provided on the substantially left and right ends of the rear frame 2b. Also, the forehead pressing portion 4 is mounted at the substantially central position of the inside of the front frame 2a. The forehead pressing portion 4 is constituted by a front pad base 4a and a front pad 4b for pressing the forehead when the apparatus is mounted. The occipital pressing portion 5 is likewise mounted on the rear frame 2b, and the occipital pressing portion 5 is constituted by a rear pad base 5a and a rear pad 5b.

During the mounting, the position adjustment knobs 3 are forwardly slid, and the head is nipped and held by the front pad 4b and the rear pad 5b. The position adjustment knobs 3, even if the hands are released from the knobs, can be positionally fixed, for example, by a ratchet mechanism incorporated in the frame, and when they are to be detached, they are unlocked by depressing a release button.

Here, the supporting frame 7 is rotatably mounted on the shaft 2c. The head supporting portions 6 each constituted by a head rotary shaft 6a connecting one end of the elastic member 8 and a supporting portion connecting member 6b are integrally coupled to the opposite ends of the supporting frame 7. The head rotary shaft 6a is incorporated in the supporting portion connecting member 6b so as to be rotatable about the x-axis in FIG. 1.

Figure 3:
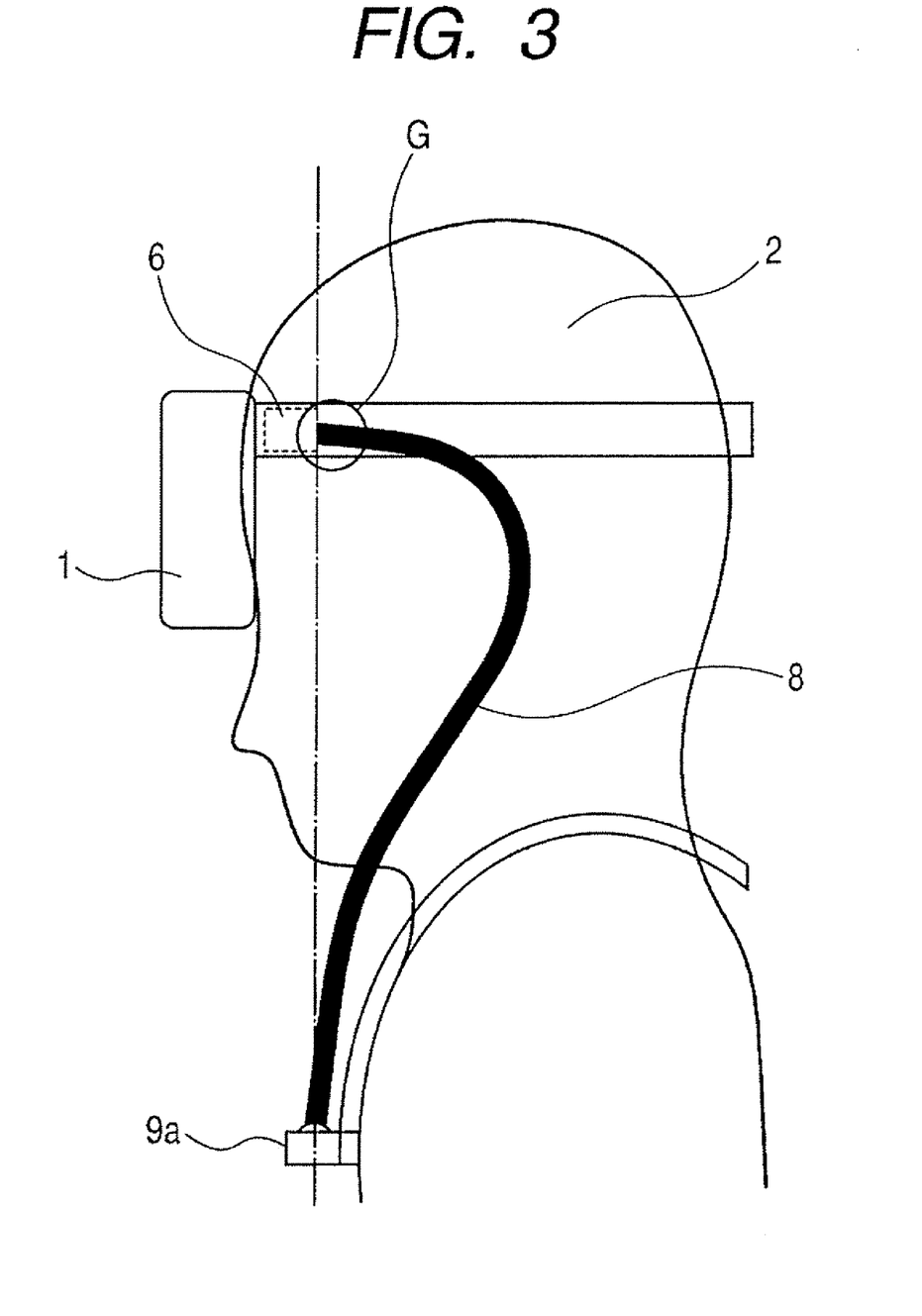
FIG. 3 illustrates a state in which in Embodiment 1 of the present invention, the position of the center of gravity of a head mounting mechanism provided with a display portion and the position of a universal joint are coincident with each other on a vertical line.

The shoulder supporting portion 9 is constituted by a universal joint 9a such as a ball joint, a shoulder pad base 9b and a shoulder pad 9c. The other end of the elastic member 8 is connected to the universal joint 9a. In the present embodiment, as shown in FIG. 3, positions, in the front-back direction, of the center of gravity of the head mounting portion and the universal point 9a are designed to coincide with each other on a vertical line.

The movement of each mechanism portion will now be described.

The elastic member 8 is designed to have a spring force capable of supporting the head mounting portion and yet, to be made as low as possible in spring constant, whereby the resistance by the elastic member 8 when moving head may be small. Thus, it becomes possible to move the head without a malaise. In the mounted state, as previously described, the position of the center of gravity of the head mounting portion and the position of the universal joint 9a are coincident with each other on the vertical line (FIG. 3). Accordingly, in a state in which the head is not inclined, the balance of the head mounting portion is kept and thus, torque in the forward and rearward direction does not fall on the head.

Figure 4:
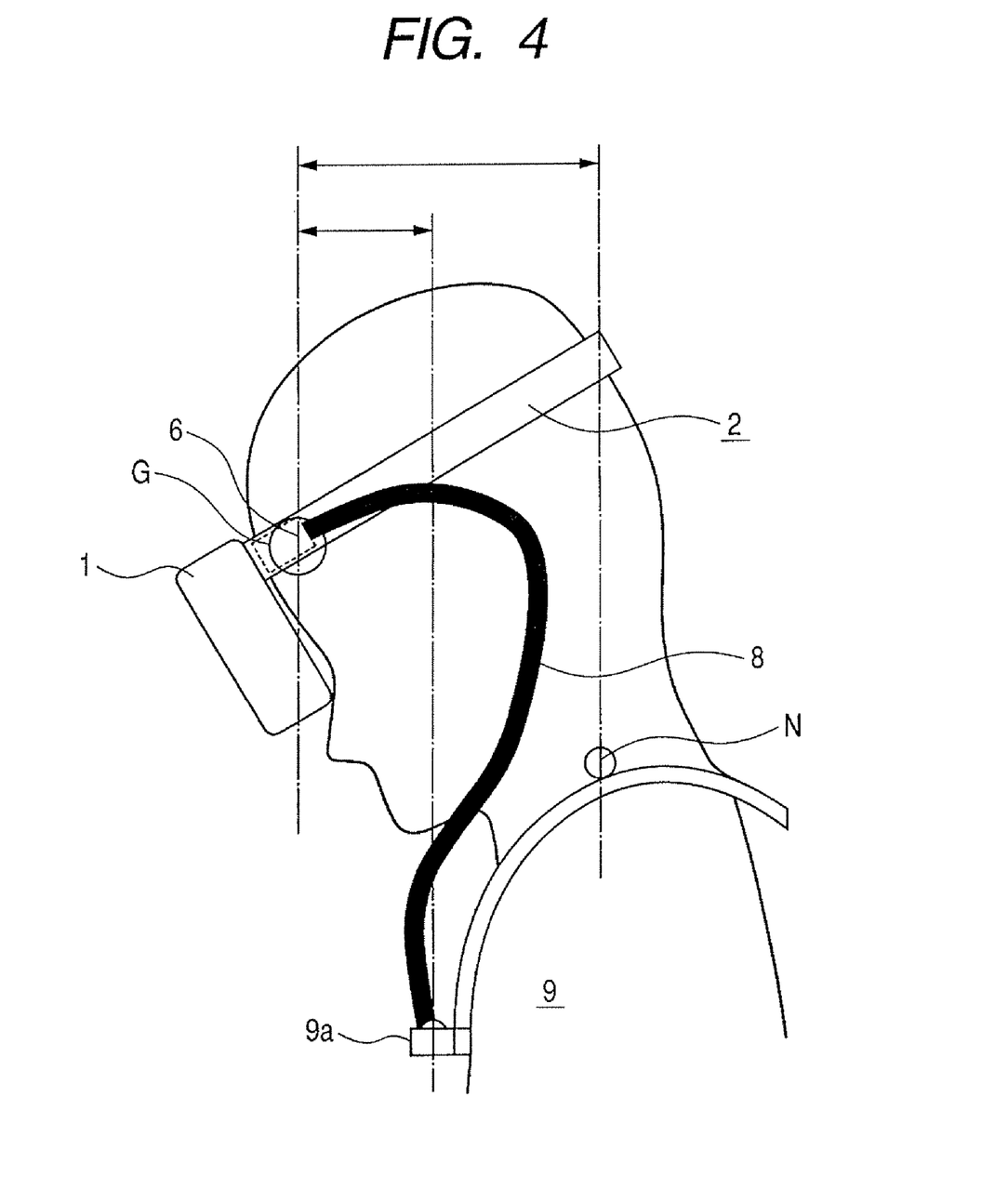
FIG. 4 illustrates that in Embodiment 1 of the present invention, when the head is inclined back and forth, such a torque that a burden is applied to the neck does not occur.

As previously described, by configuring the spring constant of the elastic member 8 low, the resistance by the elastic member 8 when moving the head can be made small, and the head can be moved without a malaise. When at that time, the head has been moved, the resistance by the deformation of the elastic member is made as small as possible. In order to realize it, as described above, the head supporting portion 6a rotatable about the x-axis is constructed, and the universal joint 9a is constructed on the shoulder supporting portion. When the head is inclined back and forth, the positional relation between the head mounting portion and the universal joint 9a is deviated, and the torque due to the weight of this head mounting portion is generated. According to the present embodiment, however, the amount of deviation from the center of gravity of the head mounting portion may be small as compared with a case where the weight is supported by the neck as in the conventional apparatus. Therefore, when as shown in FIG. 4, the head is inclined back and forth, torque which burdens the neck is not generated.

Figure 5:
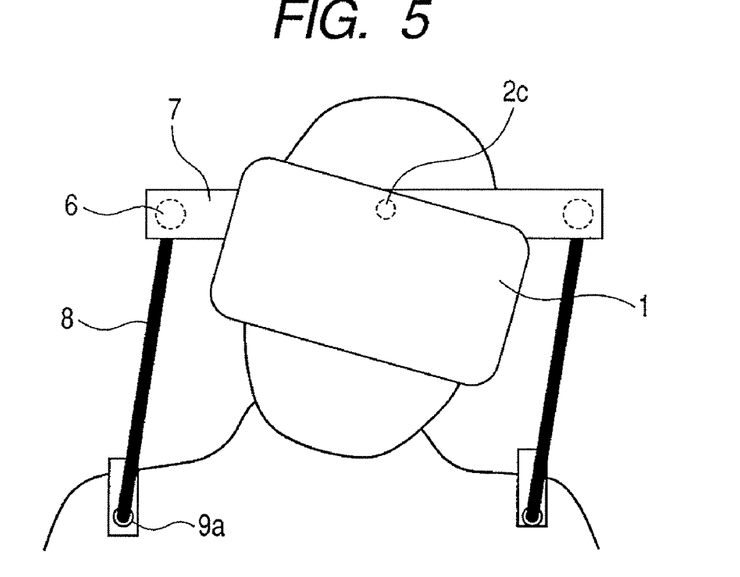
FIG. 5 illustrates that in Embodiment 1 of the present invention, the head can be inclined to the left and right without a malaise.
Figure 6:
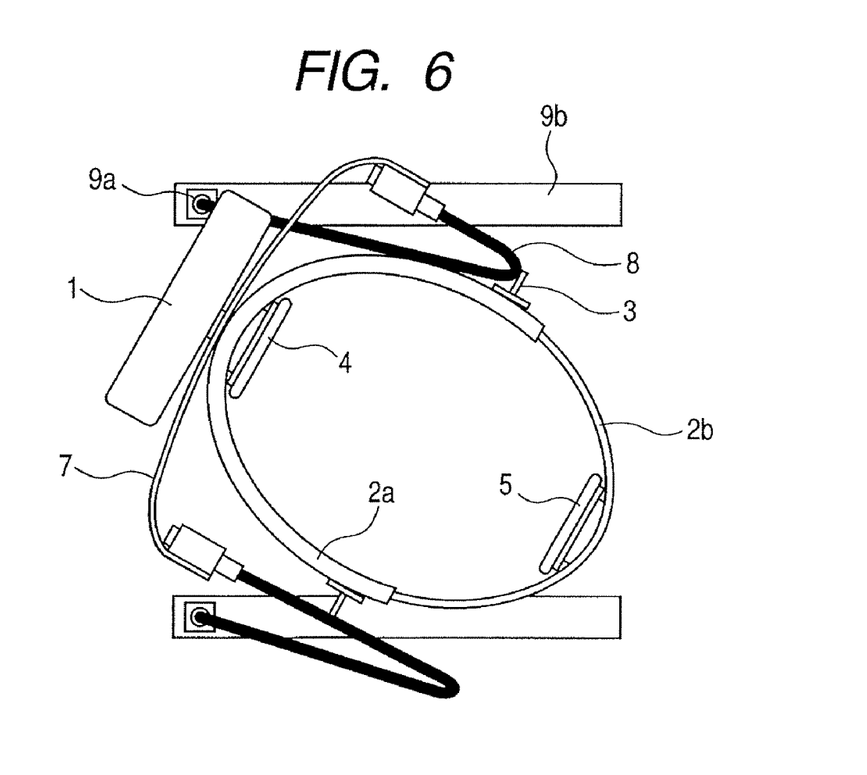
FIG. 6 illustrates that in Embodiment 1 of the present invention, the head can be twisted to the left and right without a malaise.
Figure 10:
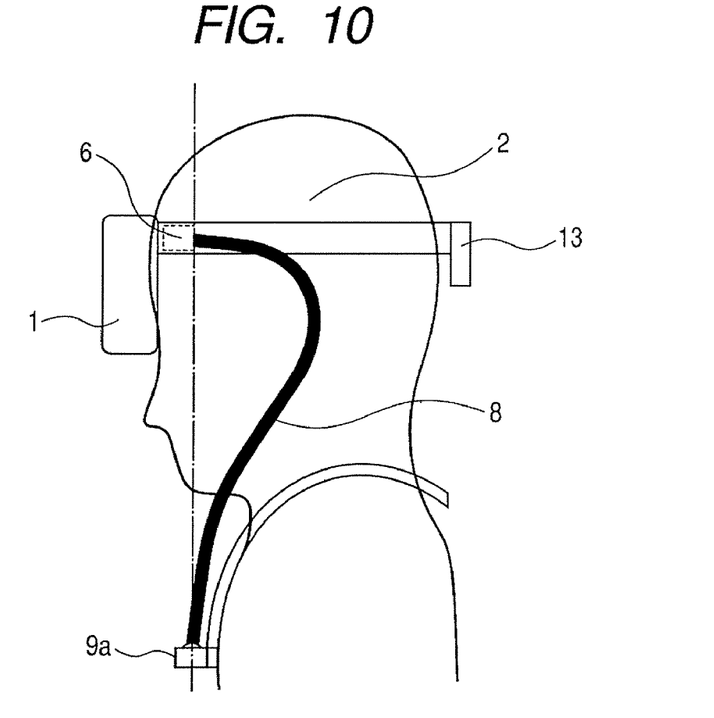
FIG. 10 is a side view showing an example of construction having counter weight mounted in the mounting mechanism according to Embodiment 1 of the present invention.

The head supporting portion 6 can adopt a configuration having 1-degree-of-freedom in order to disperse part of the weight and suppress the feeling of slipping down due to the torque in a vertical direction. Also, as shown, for example, in FIG. 10, counter weight 13 may be used in the rearward of the rear frame 2b so that the longitudinal positions of the head mounting portion, the head supporting portion 6 and the universal joint 9a may be on a vertical line. Also, when the head is inclined to the left and right, as shown in FIG. 5, the supporting frame 7 is rotated about the x-axis relative to the apparatus and the head rotary shaft 6a is rotated about the x-axis relative to the supporting portion connecting member 6b and become parallel to the latter and therefore the forces of the left and right elastic members 8 become constant. Thereby, it becomes possible to incline the head to the left and right without a malaise. Thus, it is possible to make a construction having at least 6-degree-of-freedom. Also, when the head is twisted to the left and right, as shown in FIG. 6, the elastic members 8 are deformed and also, the universal joint 9a is rotated about the z-axis. Thereby, the head can be twisted to the left and right without a malaise. Thus, it is possible to make a construction having 6-degree-of-freedom.

Embodiment 2

Figure 7:
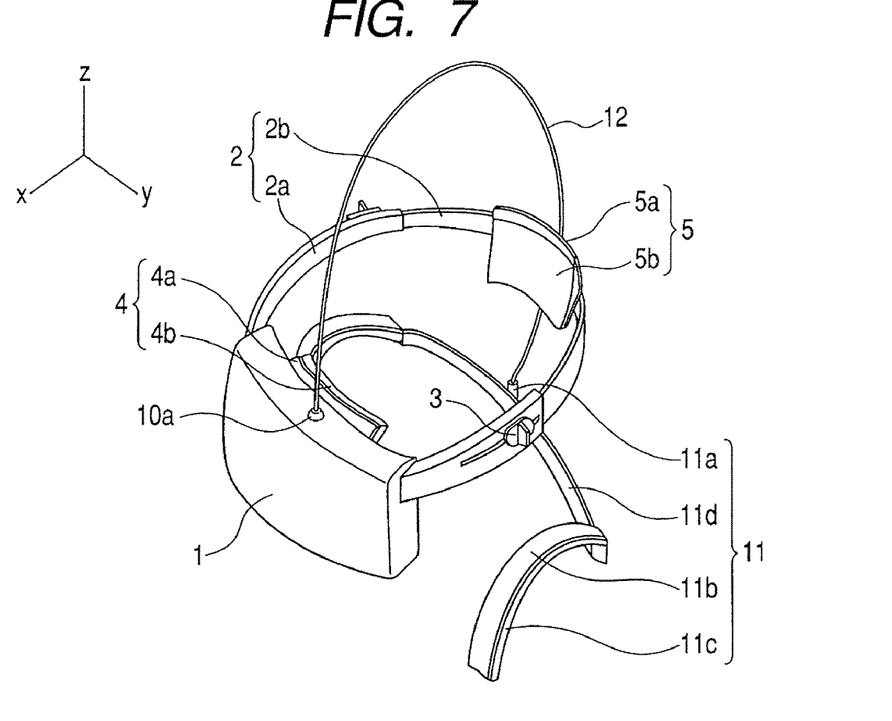
FIG. 7 is a perspective view of a head-mounted image display apparatus according to Embodiment 2 of the present invention.

In Embodiment 2, a head-mounted image display apparatus having a mounting mechanism different from that of Embodiment 1 is configured. FIG. 7 shows a perspective view of the head-mounted image display apparatus according to the present embodiment. The basic construction of the present embodiment is similar to that of Embodiment 1, and in FIG. 7, the same portions as those in Embodiment 1 are given the same reference characters and the common portions need not be described. In FIG. 7, the reference character 10a designates the universal joint of the head supporting portion, the reference numeral 11 denotes shoulder supporting portions, and the reference numeral 12 designates an elastic member.

In the present embodiment, the head supporting portion is the universal joint 10a. The left and right shoulder supporting portions 11 are connected together at a shoulder pad base 11b and a shoulder pad 11c by a shoulder frame 11d having a shape along the back. At the center of the shoulder frame 11d, a shoulder frame connecting portion 11a connecting the elastic member 12 is provided for connecting the universal joint 10a of the head supporting portion and the shoulder supporting portion 11 together. The shoulder frame connecting portion 11a has a mechanism rotatable about the z-axis.

In the construction of the present embodiment, the weight of a head mounting portion provided with a display portion is suspended from above and supported by the single elastic member 12. Also, the position of the universal joint 10a of the head supporting portion is made coincident with the center of gravity of the head mounting portion in the front-back direction so as to decrease the moment due to the weight of the head mounting portion to the neck. Thereby, the burden to the neck and an unpleasant feeling such as the feeling of slipping down of the forehead pressing portion can be mitigated, and it becomes possible to obtain a better feeling of wearing.

Figure 8:
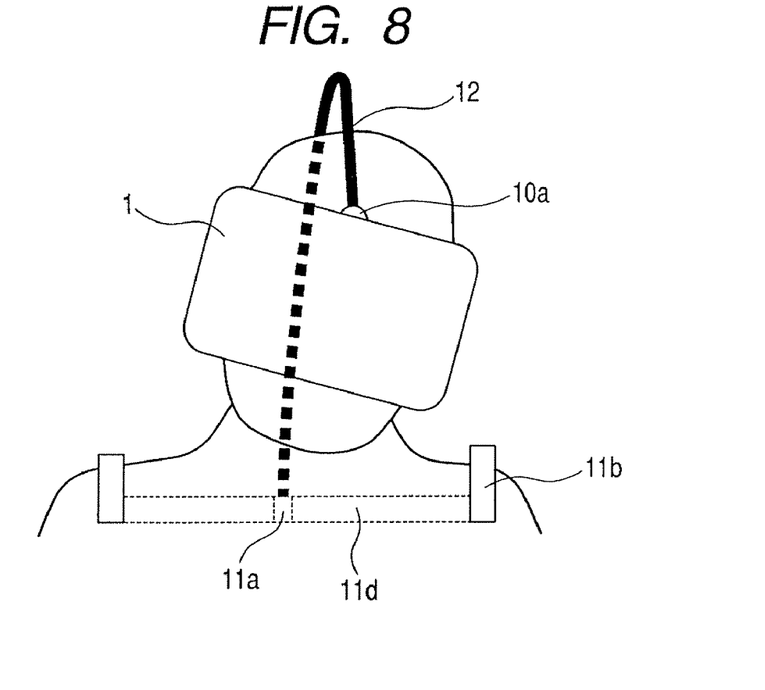
FIG. 8 illustrates that in Embodiment 2 of the present invention when the head is inclined to the left and right, the degree of freedom of the movement of the head can be secured.
Figure 9:
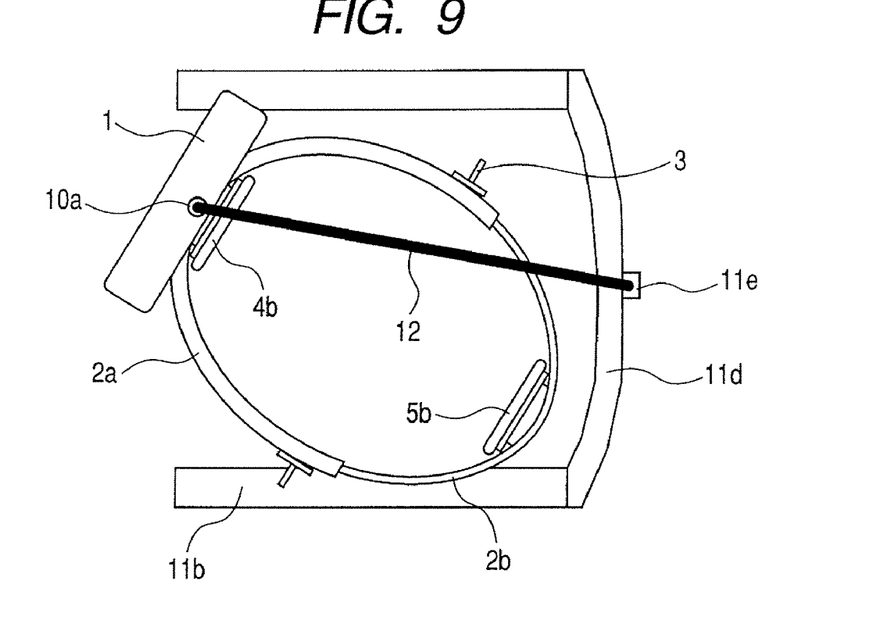
FIG. 9 illustrates that in Embodiment 2 of the present invention, when the head is twisted to the left and right, the degree of freedom of the movement of the head can be secured.

When the wearer inclines his head to the left and right, the degree of freedom of movement of the head can be secured by the deformation of the elastic member 12 and the rotation of the universal joint 10a of the head supporting portion, as shown in FIG. 8. Also, when the head is inclined back and forth, the degree of freedom of the movement of the head can likewise be secured by the deformation of the elastic member 12 and the rotation of the universal joint 10a of the head supporting portion. Also, when the head is twisted to the left and right, the degree of freedom of the movement of the head can be secured by the deformation of the elastic member 12, the rotation of the universal joint 10a of the head supporting portion and further, the rotation of the shoulder frame connecting portion 11a, as shown in FIG. 9.

Embodiment 3

Figure 11:
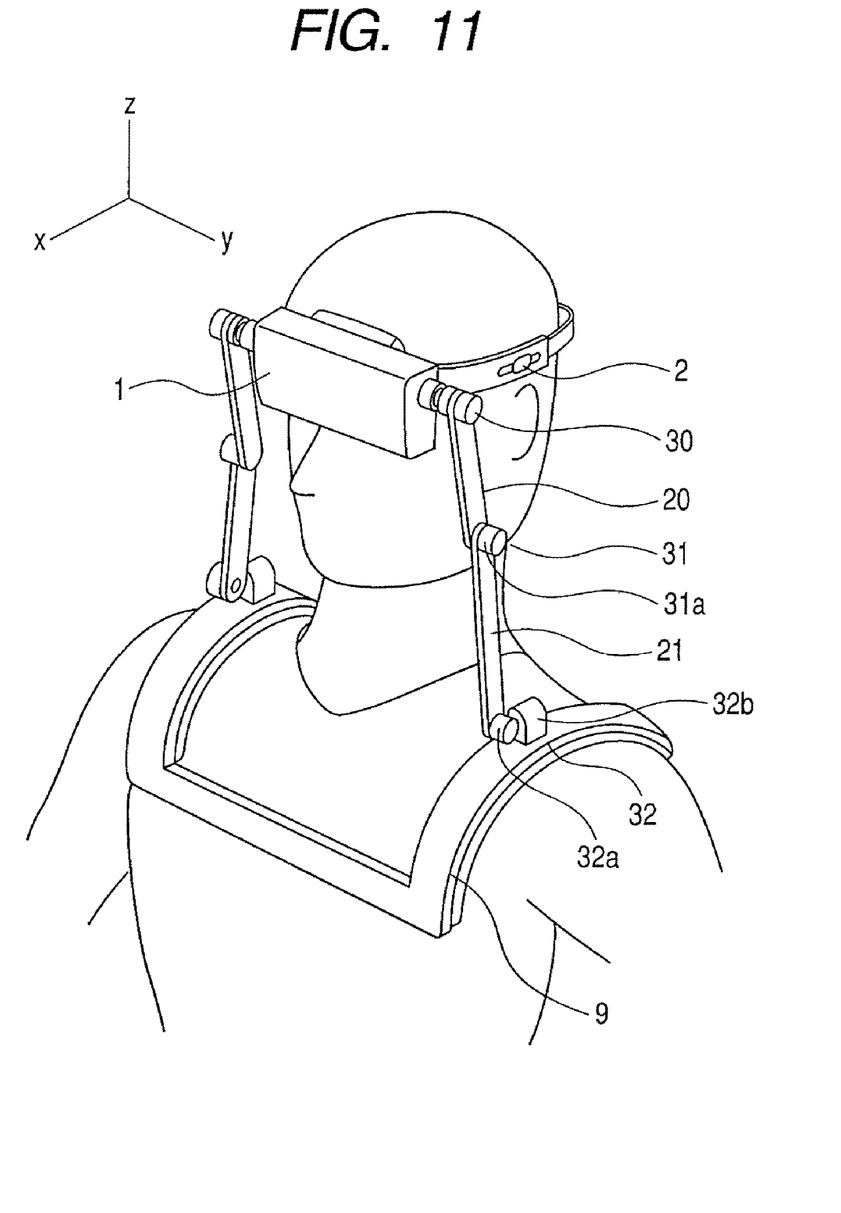
FIG. 11 is a perspective view showing a head-mounted image display apparatus according to Embodiment 3 of the present invention.
Figure 12:
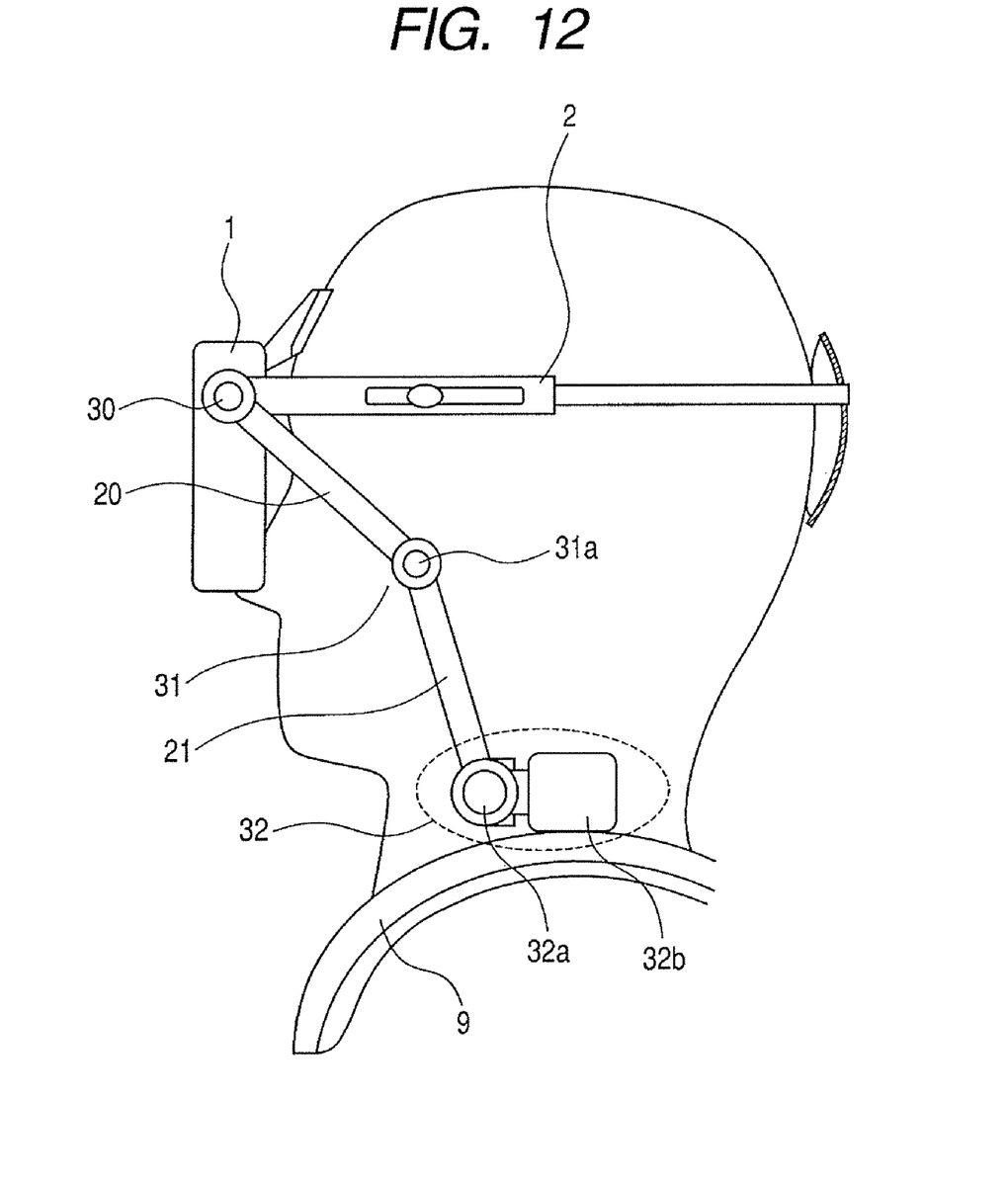
FIG. 12 is a side view showing the head-mounted image display apparatus according to Embodiment 3 of the present invention.

In Embodiment 3, a head-mounted image display apparatus having a mounting mechanism different from that of Embodiment 1 or 2 is configured. FIG. 11 shows a perspective view of the head-mounted image display apparatus according to the present embodiment. Also, FIG. 12 shows a side view of the head-mounted image display apparatus according to the present embodiment. In FIGS. 11 and 12, members common to those in Embodiments 1 and 2 are given the same reference characters and need not be described. The present embodiment differs from Embodiments 1 and 2 in that the connecting member for connecting the head mounting portion and the weight supporting portion is not constituted by an elastic member.

In FIGS. 11 and 12, a mounting portion 2 constituting a portion of the head mounting portion and a shoulder supporting portion 9 for supporting the weight thereof are connected together by arm members 20 and 21 through a connecting portion. The mounting portion 2 and the arm member 20 are connected together through a connecting portion 30, the arm member 20 and the arm member 21 are connected together through a connecting portion 31, and the arm member 21 and the shoulder supporting portion 9 are connected together through a connecting portion 32. The movement of the wearer's head is detected by a pressure sensor provided on the connecting portion 30, and on the basis of the detection, a drive motor (actuator) provided in each connecting portion is driven. By such a construction, the weight of the mounting portion 2 is supported and yet the mounting portion 2 is made to follow the movement of the wearer's head. That is, in the present embodiment, the connecting member is realized by a connecting mechanism dynamically movable in accordance with the wearer's movement.

The details of the connecting portion 30 will now be described with reference to FIG. 13. The connecting portion 30 is constituted by a drive motor 40, a sensor portion 41 and a ball joint 42.

The sensor portion 41 is constituted by an outer member 50 and a sensor mounting member 51. The outer member 50 is rotatably drivably mounted on the rotary shaft of the drive motor 40 integrally mounted on the distal end of the arm member 20. The sensor mounting member 51 is fitted to the outer member 50. On the contact surface between the portion 51a of the sensor mounting member 51 and the inner wall of the outer member 50, pressure sensors $51x$, $51y$ and $51z$ constituted by piezoelectric elements or the like for detecting the loads of the sensor mounting member 51 in the directions of the three axes thereof (orthogonal coordinate axes x, y and z in FIG. 11).

The ball joint 42 is constituted by a coupling member 60 integrally provided on the mounting portion 2 and a spherical body 61 integrally provided on the other end of the sensor mounting member 51. The spherical body 61 is fitted in the coupling member 60.

Description will now be made of the connecting portion 31 of the arm member 20 and the arm member 21, and the connecting portion 32 of the arm member 21 and the shoulder supporting portion 9.

A drive motor 31a is provided in the connecting portion 31 of the arm member 20 and the arm member 21. This drive motor 31a is integrally mounted on the arm member 21, and the arm member 20 side is mounted on the rotary shaft of the drive motor 31a.

The connecting portion 32 of the arm member 21 and the shoulder supporting member 9 is provided with a drive motor 32a and a drive motor 32b. The drive motor 32a is a motor rotatably drivable in the direction of the x-axis of the orthogonal coordinates x, y, z with the shoulder supporting portion 9 as the reference. The arm member 21 is mounted on the rotary shaft of this drive motor 32a.

The drive motor 32b is a motor rotatably drivable in the direction of the y-axis of the orthogonal coordinates x, y, z with the shoulder supporting portion 9 as the reference. The drive motor 32a is mounted on the rotary shaft of this drive motor 32b. That is, the rotary shafts of the drive motor 32a and the drive motor 32b are orthogonal to each other.

Here, it is desirable from the necessity of supporting the weight of the head mounting portion in a non-driving state that the above-described drive motors 40, 31a, 32a and 32b be ultrasonic motors or the like of which the rotational position can be kept. However, besides the ultrasonic motors, a friction mechanism may be provided on a rotating portion.

Also, each drive motor is provided with an encoder for detecting the rotational position thereof.

The above-described connecting mechanism is provided at each of the left and right of the wearer. Also, the connecting portion 30 is mounted relative to the head mounting portion so as to be substantially at the center of gravity in the direction of the y-axis. Accordingly, the head mounting portion is supported in a balanced manner at the front and rear and at the left and right, and a load such as a moment does not act on the wearer.

By the above-described construction, the connecting portion 30 becomes movable to any position in the directions of the x-, y- and z-axis on a space. Also, the mounting portion 2 provided with the display portion 1 is rotatable in any direction relative to the x-, y- and z-axis by the ball joint 42.

When the wearer inclines his head to the front and rear and to the left and right, the mounting portion 2 tends to move integrally with the head. This movement is detected by the pressure sensors 51$x$, 51$y$ and 51$z$ provided on the connecting portion 30. On the other hand, the spatial position, i.e., the position and direction relative to the space coordinates x, y, z, of the connecting portion 30 are found from the rotation angle detected by the encoder of each drive motor. From this position and direction, and the load detected by the pressure sensors 51$x$, 51$y$ and 51$z$, load components Fx, Fy and Fz relative to the directions of the space coordinates x, y, z are found. Each drive motor is rotatively controlled so that these load components may be zero.

As described above, on the basis of the load detected by the sensor portion 41, the drive motor provided in each connecting portion is rotatively controlled, whereby without the weight of the head mounting portion being applied to the observer, the display portion 1 can be made to follow the observer's head and move.

Figure 13:
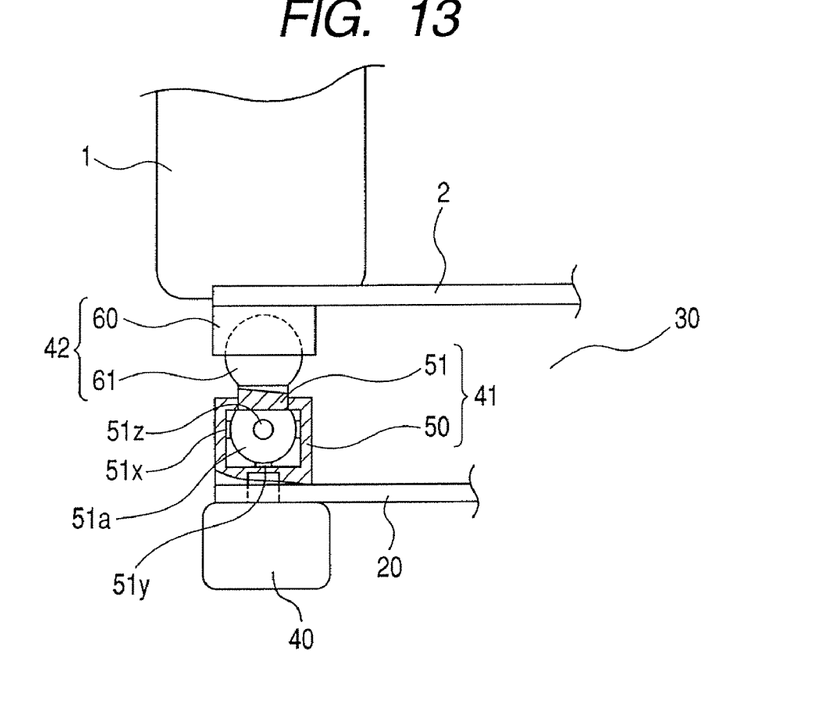
FIG. 13 is an illustration showing the details of a connecting portion in Embodiment 3 of the present invention.
Figure 14:
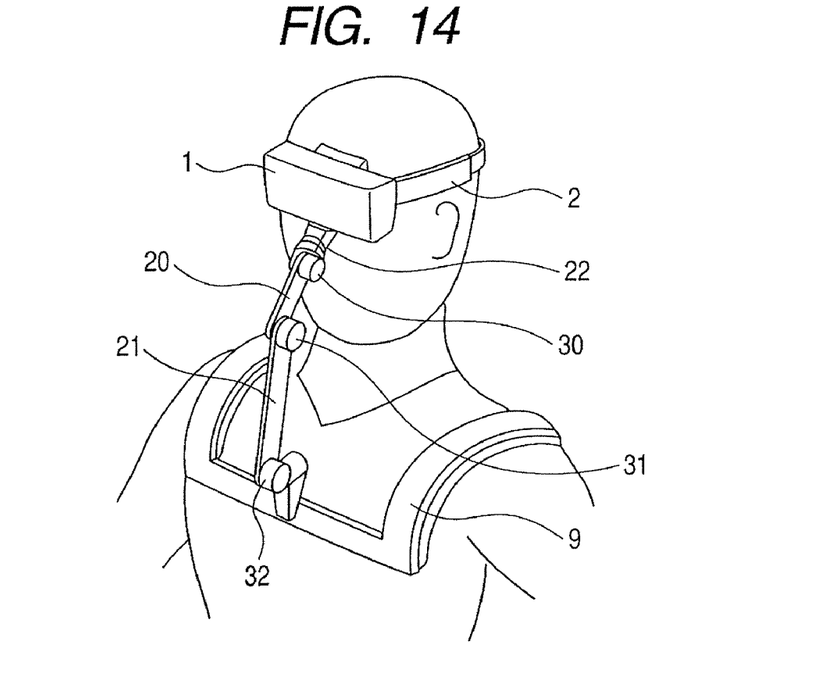
FIG. 14 is a perspective view showing a modification of Embodiment 3 of the present invention.

While in the above-described embodiments, the connecting mechanisms are provided at the left and right of the wearer to avoid being disposed at the front of the wearer, they may be provided at the center, as shown in FIG. 13. Besides the above-described embodiments, the connecting mechanism can be a connecting mechanism which can cover and follow the range of movement of the head with the neck as the center of rotation.

While in the foregoing embodiments, description has been made of an example of the construction in which part of the weight is dispersed and supported by the shoulder supporting portion, the present invention is not restricted to such embodiments. The supporting portion may be constructed on any other body portion such as not only the shoulder, but the waist portion than the head which can disperse and support part of the weight of the head mounting mechanism provided with a display portion, to thereby disperse part of the weight.

This application claims priority from Japanese Patent Applications No. 2005-204829 filed on Jul. 13, 2005, and No. 2006-185684 filed on Jul. 5, 2006, which are hereby incorporated by reference herein.

What is claimed is:

1. A mounting mechanism, comprising:
   a head mounting portion for mounting a display portion on head of a user;
   a first weight supporting portion mounted on shoulder of the user, the first weight supporting portion supporting a part of weight of the head mounting portion;
   a second weight supporting portion on head of the user, the second weight supporting portion supporting a part of weight of the head mounting portion other than the weight being supported by the first weight supporting portion; and
   a connecting member suspending the head mounting portion from above, and connecting to the first weight supporting portion so that the head mounting portion may be movable following movement of the head.

2. A mounting mechanism according to claim 1, wherein said connecting member is a member having elasticity.

3. A mounting mechanism according to claim 1, wherein said connecting member has a plurality of arm members and an actuator for driving the arm members.

4. A mounting mechanism according to claim 1, wherein at least one of said head mounting portion and said first weight supporting portion is connected to said connecting member through a universal joint.

5. A mounting mechanism according to claim 4, wherein center of gravity of said head mounting portion and position of said universal joint are configured to coincide with each other on a vertical line.

* * * * *